United States Patent Office 2,783,216
Patented Feb. 26, 1957

2,783,216

RESINOUS PRODUCTS FROM MANNICH BASES OF AROMATIC POLYKETONES WITH HYDROGEN SULFIDE AND/OR POLYTHIOLS

Robert W. Martin, Lafayette, Calif., assignor to Shell Development Company, New York, N. Y., a corporation of Delaware No Drawing. Application June 30, 1954,
Serial No. 440,543

13 Claims. (Cl. 260—63)

This invention relates to a process for the manufacture of a new resinous product from Mannich bases of aromatic polyketones.

According to the process of the invention, very useful resinous products are obtained by reacting hydrogen sulfide, a polythiol or mixtures thereof, with an aminoketone having at least two acyl groups of a monocarboxylic acid linked directly by the carbonyl carbon atoms to nuclear carbon atoms of an aromatic nucleus, and which acyl groups each contain an alpha carbon atom having a hydrogen atom and the methylene carbon atom of a tertiary aminomethylene group linked directly thereto. For example, hydrogen sulfide is reacted with the Mannich base, 1,4-bis(beta-dimethylaminopropionyl)benzene, to obtain the resinous product having the repeating unit therein indicated in the following equation:

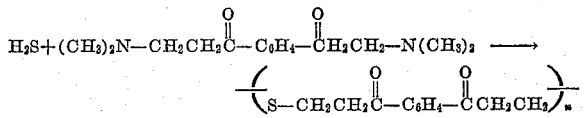

End groups of the foregoing polymer chain are probably dimethylamino groups. The resinification occurs with formation and liberation of dimethylamine.

Particularly useful thermoplastic products of linear character are obtained with use as reactants of an aminoketone containing only two of the amine-substituted acyl groups, and of hydrogen sulfide or a dithiol. Especially suitable products are obtained in this case with use of hydrogen sulfide. Instead of obtaining such thermoplastic products, sufficient reaction of an aminoketone containing more than two of the amine-substituted ketone groups with hydrogen sulfide or a dithiol, or of an aminoketone containing only two of the amine-substituted acyl groups with a polythiol containing more than two mercaptan groups, or of an aminoketone containing more than two of the amine-substituted acyl groups with a polythiol containing more than two mercaptan groups gives a thermoset resinous product. Partly because of the difficulty and expense of obtaining appropriate reactants, the thermoset products are generally less desirable than the thermoplastic products from reaction of two difunctional reactants. However, by bringing the reactants giving thermoset products together at the place of use, or by only partially reacting them initially so the product is thermoplastic, and then completing the reaction at the place of use, these compositions and products are useful in a variety of applications such as molding, impregnating and laminating sheet material, surface coating, etc.

The aminoketones are Mannich bases of an aromatic polyketone and a secondary mono-amine. The aromatic polyketones contain a plurality of acyl groups of a monocarboxylic acid, each acyl group being substituted on and linked directly by the carbonyl carbon atom to a nuclear carbon atom of an aromatic nucleus, and each acyl group containing an alpha carbon atom to which is directly linked two to three hydrogen atoms. The aminoketones are obtained by the Mannich reaction wherein the aromatic polyketone is reacted with the secondary amine, preferably as its hydrochloride salt, and formaldehyde, as described in my copending application, Serial No. 440,542, filed of even date herewith, wherein the new aminoketones are claimed. Typical aminoketones used in the present invention include: 1,2-bis(beta-dimethylaminopropionyl)benzene; 1,3-bis(beta-dimethylamino-propionyl)benzene; 1,4-bis(beta-dimethylaminopropionyl)benzene; 1,4-bis(beta-diethylaminopropionyl)-2,3,5,6-tetrachlorobenzene; 1,4-bis(alpha-methyl beta-diisopropylaminopropionyl)benzene; 1,4-bis(alpha-phenyl beta-didodecylaminopropionyl)benzene; 1,4 - bis(alpha - hexyl beta-methylethylaminopropionyl)benzene; 1,4-bis-(alpha-hydroxy beta-dibenzylaminopropionyl)benzene; 1,4-bis-(beta-piperidinylpropionyl)benzene; 1,4-bis(beta-morpholinopropionyl)-2,3,5,6-tetramethylbenzene; 1,3 - bis(beta-methylalinopropionyl)-2,4-dimethylbenzene; 1,3-bis(beta-dimethylaminopropionyl)-2,4,6-trimethylbenzene; 1,3-bis-(beta-dialylaminopropionyl)benzene; 1,3,5 - tris(beta-diethylaminopropionyl)benzene; 4,4'-bis(beta-dimethylaminopropionyl)diphenyl; 1,4 - bis(beta - dibenzylaminopropionyl)naphthalene; 1,5-bis(beta - diisobutylaminopropionyl)-2-ethylbenzene; 2,2'-bis(beta - dimethylaminopropionyl)diphenylmethane; 1,3-bis(beta-dimethylaminopropionyl)-2,4,5-trimethoxybenzene; 9,10-bis(beta - morpholinopropionyl)phenanthrene; 3,9-bis(alpha - dimethylamino-methylpropionyl)perylene; 1,4-bis(beta-dichloroethylaminopropionyl)benzene; and the like. In the aminoketones, the aromatic nucleus can be mononuclear (benzoid) in structure, or polynuclear as contained in diphenyl, diphenylpropane, and triphenylmethane compounds, including condensed ring aromatics as in naphthalene, anthracene and the like. The acyl groups of the aminoketone substituents linked to the aromatic nucleus can be as contained in various monocarboxylic acids, whether saturated or unsaturated, and whether aliphatic, alicyclic, aromatic or heterocyclic, it being only necessary that there be at least one hydrogen atom and the methylene carbon atom of the tertiary aminoethylene group linked to the alpha carbon atom. Besides having the noted essential structure, the aminoketone reactants may contain other substituent radicals such as alkyl, alkenyl, aryl, amino, halo, hydroxy, alkoxy, carboxyl or acyloxy groups, whether or not such groups are reactive, such reactive groups merely complicating the resinous structure of the formed products of the invention. Preferably, the aminoketones contain two acyl groups of a saturated fatty acid of 2 to 10 carbon atoms, each of which acyl groups have a hydrogen atom and a tertiary aminomethylene group linked directly by the methylene carbon atom to the alpha carbon atom thereof, and are linked directly by the carbonyl carbon atom to nuclear carbon atoms of a divalent aromatic hydrocarbon group, especially a phenylene group. The tertiary amino substituent may be either one wherein the nitrogen atom is a member of a heterocyclic ring as in piperidinyl, pyrrolyl or morpholino groups, or wherein the nitrogen atom is linked to two separate radicals as in dimethylamino, benzylmethylamino, and dipropargylamino groups. It is also preferred that the aminoketone reactant be free from reactive groups other than the tertiary amino and the carbonyl groups.

The polythiols used as reactant are of most varied structure. The aminoketones may be reacted with any material or materials containing at least two reactive mercapto —SH groups. They may be aliphatic, alicyclic, aromatic or heterocyclic, saturated or unsaturated and may be monomeric or polymeric. In addition, they may, and preferably do in some instances, contain sulfur and/or oxygen ether linkages within their molecules, and may also be substituted with halogen atoms, hydroxyl groups and the like which are preferably non-reactive.

Simpler polythiols are exemplified by 1,2-ethanedithiol; 1,5 - pentanedithiol; 1,4 - butanedithiol; 1,4 - cyclohexanedithiol; 1,2,4-butanetrithiol; dimercapto diethylformal ($HSC_2H_4OCH_2OC_2H_4SH$); 1,7-dicanedithiol; 3,3'-thiodipropanethiol; 4,4' - thiodihexanethiol; 3,3' - oxydipropanethiol; 4-hydroxy-1,6-octanedithiol; 1,6-octenedithiol; 1,3 - benzenedithiol; 1,4 - benzenedithiol; 1,3,5-benzenetrithiol; 4,4'-diphenyldithiol; 2-chloro - 1,5-benzenedithiol; tetrahydropyran-2,3 - dipropanethiol; dihydrofuran - 2,5-butanethiol; sulfolane - 2,5 - dihexanethiol; furan - 2,5-dibutanethiol; 3-hydroxy-2,5-dioctenethiol; and the like. Preferred polythiols used in the process comprise the aliphatic dithiols containing 2 to 18 carbon atoms and the heterocyclic dithiols containing from 7 to 12 carbon atoms. Particularly preferred polythiols are the alkanedithiols and alkenedithiols containing from 2 to 15 carbon atoms, the thiodialkanethiols, thiodialkenethiols, oxydialkanethiols, and oxydialkenethiols containing from 2 to 16 carbon atoms, and the heterocyclic polythiols of the formula HSRXRSH wherein X is a furan, dihydrofuran, tetrahydrofuran, pyran, dihydrofuran and tetrahydropyran ring or their substitutes and R is a divalent diphatic hydrocarbon radical.

Polymeric polythiols may also be used such as are disclosed, for example, in Patrick, U. S. 2,466,963. These include polymers of the formula $HS(CH_2CH_2OCH_2OCH_2CH_2SS)_n$
$CH_2CH_2OCH_2OCH_2CH_2SH$ obtained by the oxidation of dimercapto diethyl formal with hydrogen peroxide. Other polythiopolymercaptans are obtained by reacting an organic dihalide with sodium polysulfide to form a high molecular weight polymer containing a plurality of disulfide linkages, and then splitting or degrading that polymer so as to obtain mercapto groups therein as by treating a water dispersion of the polymer with sodium hydrosulfide and sodium sulfite.

The resinous products of the invention are formed by merely mixing the reactants together at ordinary temperature of about 20 to 25° C. It is convenient to start the reaction at ordinary temperature and to complete the reaction at elevated temperature. The use of temperature of about 0 to 100° C. is suitable in general although lower or higher temperatures may be used if desired. The reaction is conducted with either batchwise or continuous mixing of the reactants.

The reaction is usually effected with the reactants in the presence of a solvent. Although water may be used for this purpose, better results are realized with use of a lower alcohol such as methanol, ethanol and the like. Other solvents may be used, if desired, including substances which are also solvents for the resulting polymer. In many cases, phenol cresol, and boiling dimethyl formamide and cyclohexanone are suitable product solvents.

The reactants are generally brought together in approximately equivalent proportions although a considerable excess or deficiency of one over the other may be used if desired. By equivalent proportions, reference is made to such an amount of the sulfur-containing reactant that the initial mixture contains one sulphydryl —SH radical for each amino group in the Mannich base. Thus, with an aminoketone containing two of the tertiary amino groups, there are used one mole of hydrogen sulfide or dithiol, or two-thirds of a mole of trithiol with each mole of the aminoketone.

In conducting the reaction, it is convenient to use a salt of the aminoketone, e. g. the hydrochloride salt, since the Mannich bases are often prepared as their salts. In order to effect the resinforming reaction, the salts are first substantially neutralized with a basic material. When hydrogen sulfide is intended as the sulfur-containing reactant, the aminoketone hydrochloride salt is mixed with a neutralizing amount of alkali metal sulfide whereupon the free base of the aminoketone is formed along with hydrogen sulfide and these two then react to give the resinous product. Use of alkali metal polysulfide may be used in this case. Additional hydrogen sulfide may be added as desired. In like manner, when a polythiol is used as reactant with the salt of the aminoketone, the polythiol is introduced into the reaction mixture as the corresponding alkali metal mercaptide. If desired, of course, the salt of the aminoketone may be first neutralized separately with caustic before mixing with the sulfur-containing reactant. In order to obtain a resinous product free of salt, it is preferable in forming thermoset products from tri- or higher functional reactants to effect the reaction with use of the free base of the aminoketone and the free sulfhydryl reactant.

The resinification reaction is continued for several to a number of hours after bringing the reactants together. Both elevated temperature and agitation assist in completing the reaction. In the usual case where a solvent for the product is not present, the resinous product is obtained as a precipitate in the reaction mixture. It is recovered by filtration, centrifugation and the like. In order to remove undesirable impurities, the precipitate is ordinarily washed with hot water and hot aliphatic ketones. Since formation of the resinous product produces secondary amines which are valuable by-products, especially for formation of additional Mannich base, the amines may be recovered from the reaction mixture by customary methods such as distillation, extraction and the like.

The resinous products of the reaction are very useful substances, and this is particularly true of the thermoplastic products from reaction of the Mannich bases containing two amino groups with compounds containing two sulfhydryl radicals, i. e. hydrogen sulfide or dithiols. These linear products find application as fibre-forming materials owing to their marked tendency to form crystalline substances. The products from hydrogen sulfide display good draw-down properties which permit cold drawing to filaments. These products have relatively high softening temperatures, e. g. above 200° C. These thermoplastic products may be cured by treating with oxygen, air and certain oxidizing agents at elevated temperature. Thus upon treating melted thermoplastic products with air for considerable time, they are cured to infusible resins. In general, the resinous products are viscous liquids or solids at ordinary temperature.

The invention is illustrated in the following specific examples, but it is to be understood that the invention is not to be construed as limited to details described therein. The parts and percentages are by weight.

Example 1

About 649 parts of 1,4-bis(beta-morpholinopropionyl) benzene dihydrochloride along with 3,600 parts of methanol were placed in a reaction vessel equipped with a heater, reflux condenser, thermometer and gas bubbler. To the mixture was added 360 parts of $Na_2S \cdot 9H_2O$ dissolved in 1,100 parts of water. A clear solution was formed. Hydrogen sulfide was bubbled through the solution for two hours at room temperature (20–25° C.). A white powder started to separate after only five minutes' time. The mixture was heated to reflux and bubbling of hydrogen sulfide therethrough continued for 4¾ hours. After about 3 hours refluxing, part of the methanol was allowed to escape and water was added so that the reflux temperature was increased to 95° C. The final mixture contained a copious white precipitate which was recovered by filtration. The precipitate was washed with several portions of boiling water and then dried. The yield was 350 parts or about 94% of the theoretical.

The resinous product melted at 215–220° C. It was soluble in phenol, boiling dimethyl formamide and boiling cyclohexanone, but insoluble in tetrahydrofuran, pyridine and ethylene dichloride, whether cold or boiling. Analysis of the resinous product gave the following values:

|  | Found | Calculated |
|---|---|---|
|  | Percent | Percent |
| Sulfur | 13.1 | 14.53 |
| Nitrogen | 0.68 | 0.00 |

The calculated values are for a repeating unit of

$\{CH_2CH_2COC_6H_4COCH_2CH_2S\}_n$

Example 2

In a reaction vessel equipped with a heater, stirrer, reflux condenser, thermometer and gas bubbling device, there were placed 649 parts of 1,4-bis(beta-morpholinopropionyl)benzene dihydrochloride dissolved in 1,000 parts of water and 7,200 parts of methanol, to which 360 parts of Na₂S·9H₂O dissolved in 1,500 parts of water was added with stirring. Stirring of the mixture at room temperature of 20–25° C. was conducted for 30 minutes, and then bubbling in of hydrogen sulfide was started and continued for 2½ hours whereupon the mixture was heated to reflux. Bubbling in of hydrogen sulfide while refluxing was continued for 20 hours. The formed precipitate of resinous product was recovered by filtration, washed twice with boiling water and twice with boiling butanone, and then dried in an air oven set at 100° C. The yield was 326 parts or 98.8% of theory. Analysis of the product gave the following values:

|  | Found | Calculated |
|---|---|---|
|  | Percent | Percent |
| Carbon | 63.6 | 65.5 |
| Hydrogen | 5.8 | 5.46 |
| Sulfur | 14.0 | 14.55 |
| Nitrogen | 0.7 | 0.00 |

Example 3

Using only water as a reaction fluid, 433 parts of 1,4-bis(beta-morpholinopropionyl)benzene dihydrochloride was mixed for 30 minutes at room temperature with 240 parts of Na₂S·9H₂O and 17,000 parts of water. Hydrogen sulfide was then bubbled in the stirred reaction mixture for 3 hours followed by a 4-hour bubbling period at reflux temperature. The formed precipitate was recovered by filtration, washed twice with boiling water and twice with boiling butanone, and dried. The resulting resin in amount of 217 parts or 97.6% of theory was a white, powdery solid which melted at 217° C. Analysis gave 14.8% sulfur and 0.59% nitrogen.

Example 4

Tributylamine was used as a reaction solvent. About 7,000 parts of tributylamine was added to 649 parts of 1,4-bis(beta-morpholinopropionyl)benzene dihydrochloride dissolved in 1,500 parts of water, and while stirring at room temperature, 360 parts of Na₂S·9H₂O dissolved in 1,000 parts of water was introduced. Stirring was conducted for ½ hour, and then hydrogen sulfide was bubbled in with continued stirring for 3 hours at room temperature, and 20 hours at reflux temperature. The product precipitated in spite of the tributylamine solvent, and was recovered by filtration. The resin was washed twice with boiling water and twice with boiling butanone, and dried at about 100° C. The powdery solid product melted at 215–220° C., and analyzed as containing 15.0% sulfur and 0.7% nitrogen.

Example 5

About 325 parts of 1,5-bis(beta-morpholinopropionyl)benzene and 102 parts of pentamethylene dimercaptan in 3,600 parts of methanol and 1,250 parts of water were mixed together. Before the mercaptan was added, nitrogen was passed through the mixture until all air was removed. The mixture was stirred at room temperature for one hour. After 5 minutes' stirring, the resin started to precipitate as a mobile fluid. After 15 minutes, it was a viscous liquid; after 20 minutes, it was a very viscous liquid; after 25 minutes, it was a stringy material; and at the end, it was still a stringy substance. The end product was soluble in tetrahydrofuran. Samples taken at intermediate points all cured to solid products upon being placed on a melting point block at 220° C.

Example 6

About 180 parts of 1,4-bis(beta-morpholinopropionyl)benzene and 68 parts of pentamethylene dimercaptan were mixed together and 790 parts of ethanol was added. The solution was boiled for 10 minutes whereupon 1,500 parts of phenol was added to the solution. The ethanol was then boiled off by heating the mixture to 180° C. The phenol solution of resin was cooled and poured into 8,000 parts of methanol. The resin precipitated, was collected by filtration and dried. The resin melted without curing at 120–130° C.

I claim as my invention:

1. A process for the manufacture of a resinous product which comprises mixing and reacting a substance selected from the group consisting of hydrogen sulfide, polythiols, and mixtures thereof with an aminoketone having at least two acyl groups of a monocarboxylic acid of 2 to 10 carbon atoms linked directly by the carbonyl carbon atom to nuclear carbon atoms of an aromatic nucleus, and which acyl groups each contain an alpha carbon atom having a hydrogen atom and the methylene carbon atom of a tertiary aminomethylene group linked directly thereto.

2. The resinous product obtained according to the process of claim 1.

3. A process for the manufacture of a resinous product which comprises mixing and reacting hydrogen sulfide with an aminoketone having 2 to 3 acyl groups of a saturated fatty acid of 2 to 10 carbon atoms linked directly by the carbonyl carbon atom to nuclear carbon atoms of an aromatic hydrocarbon, and which acyl groups each contain an alpha carbon atom having a hydrogen atom and the methylene carbon atom of a tertiary amino methylene group linked directly thereto.

4. The resinous product obtained according to the process of claim 3.

5. A process for the manufacture of a resinous product which comprises mixing and reacting a polythiol with an aminoketone having 2 to 3 acyl groups of a saturated fatty acid of 2 to 10 carbon atoms linked directly by the carbonyl carbon atom to nuclear carbon atoms of an aromatic hydrocarbon, and which acyl groups each contain an alpha carbon atom having a hydrogen atom and the methylene carbon atom of a tertiary amino methylene group linked directly thereto.

6. A process for the manufacture of a resinous product which comprises mixing and reacting a dithiol with an aminoketone having 2 to 3 acyl groups of a saturated fatty acid of 2 to 10 carbon atoms linked directly by the carbonyl carbon atom to nuclear carbon atoms of an aromatic hydrocarbon, and which acyl groups each contain an alpha carbon atom having a hydrogen atom and the methylene carbon atom of a tertiary amino methylene group linked directly thereto.

7. The resinous product obtained according to the process of claim 6.

8. A process for the manufacture of a thermoplastic resinous product which comprises mixing and reacting hydrogen sulfide with an aminoketone having two beta-tertiary aminopropionyl groups linked directly by the carbonyl carbon atom to nuclear carbon atoms of a benzoid hydrocarbon.

9. A process for the manufacture of a thermoplastic resinous product which comprises mixing and reacting an aliphatic dithiol with an aminoketone having two beta-tertiary aminopropionyl groups linked directly by the carbonyl carbon atom to nuclear carbon atoms of a benzoid hydrocarbon.

10. A process for the manufacture of a thermoplastic resinous product which comprises mixing and reacting hydrogen sulfide with 1,4-bis(beta-morpholinopropionyl)-benzene.

11. The thermoplastic resinous product obtained according to the process of claim 10 which contains repeating units in the molecules thereof of the formula:

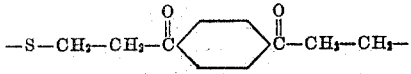

12. A process for the manufacture of a thermoplastic resinous product which comprises mixing and reacting pentamethylene dimercaptan with 1,4-bis(beta-morpholinopropionyl)benzene.

13. The thermoplastic resinous product obtained according to the process of claim 12 which contains repeating units in the molecules thereof of the formula:

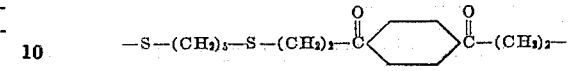

No references cited.